US012675338B2

(12) United States Patent
Sukhwani et al.

(10) Patent No.: US 12,675,338 B2
(45) Date of Patent: Jul. 7, 2026

(54) DYNAMIC ASSIGNMENT OF DEVICE QUEUES TO VIRTUAL FUNCTIONS TO PROVIDE TO VIRTUAL MACHINES

(71) Applicants: INTERNATIONAL BUSINESS MACHINES CORPORATION, Armonk, NY (US); The Board of Trustees of the University of Illinois, Urbana, IL (US)

(72) Inventors: Bharat Sukhwani, Sudbury, MA (US); Martin Ohmacht, Yorktown Heights, NY (US); Hubertus Franke, Cortlandt Manor, NY (US); Sameh Asaad, Briarcliff Manor, NY (US); Scott Smith, Brighton, MI (US); Deming Chen, Champaign, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 525 days.

(21) Appl. No.: 18/328,716

(22) Filed: Jun. 2, 2023

(65) Prior Publication Data

US 2024/0403134 A1     Dec. 5, 2024

(51) Int. Cl.
G06F 9/50          (2006.01)
(52) U.S. Cl.
CPC ............ G06F 9/5077 (2013.01); G06F 9/505 (2013.01)
(58) Field of Classification Search
CPC .... G06F 9/5077; G06F 9/505; G06F 9/45558; G06F 9/5011

USPC .......................................................... 718/105
See application file for complete search history.

(56)     References Cited

U.S. PATENT DOCUMENTS

| | | | | |
|---|---|---|---|---|
| 8,346,999 | B2 * | 1/2013 | Dubal | ................... H04L 47/125 |
| | | | | 710/52 |
| 9,003,071 | B2 * | 4/2015 | Liu | ........................... G06F 9/50 |
| | | | | 710/9 |
| 9,906,592 | B1 * | 2/2018 | Roitshtein | ............... H04L 45/24 |
| 10,069,734 | B1 | 9/2018 | Singh | |
| 10,282,220 | B2 * | 5/2019 | Koladi | ..................... G06F 9/455 |
| 10,419,447 | B2 * | 9/2019 | Chao | ................... H04L 67/1001 |
| 11,194,735 | B2 * | 12/2021 | Friedman | ............. G06F 9/5077 |
| 11,256,655 | B2 | 2/2022 | Johnsen et al. | |
| 11,341,082 | B2 | 5/2022 | Johnsen et al. | |
| 11,444,881 | B2 | 9/2022 | Johnsen et al. | |

(Continued)

OTHER PUBLICATIONS

"Congestion Management Overview", Cisco, 2020, 14 pp.

(Continued)

*Primary Examiner* — Jacob D Dascomb
(74) *Attorney, Agent, or Firm* — KONRAD, RAYNES, DAVDA & VICTOR LLP

(57)          ABSTRACT

Provided are a computer product, system, and method for dynamic assignment of device queues to virtual functions to provide to virtual machines. Queues are assigned to a virtual function to access the physical functions of the device. The virtual function is provided to a virtual machine to use to access the physical functions of the device. A determination is made of a utilization of the queues assigned to the virtual function accessed by the virtual machine. A number of the queues assigned to the virtual functions for requests submitted by the virtual machine is changed in response to the determined utilization.

23 Claims, 5 Drawing Sheets

(56) References Cited

U.S. PATENT DOCUMENTS

| | | | | |
|---|---|---|---|---|
| 2013/0247056 A1* | 9/2013 | Hattori | ............... | G06F 9/5077 |
| | | | | 718/102 |
| 2015/0088982 A1* | 3/2015 | Johnson | ............... | H04L 67/125 |
| | | | | 709/203 |
| 2023/0108461 A1* | 4/2023 | He | ............... | G06F 9/45558 |
| | | | | 718/104 |

OTHER PUBLICATIONS

Harkous, et al., "Virtual Queues for P4: a Poor Man's Programmable Traffic Manager", IEEE, 2021, 12 pp.

"Bridging in a Virtualization Capable Networking Adapter Using Direct Queue To Queue Transfer", IP.com, No. IPCOM000185228D, Jul. 16, 2009, 2 pp.

"A System and Method for Software Defined Congestion Controlled Reliable Multicast Communication in the Cloud", IP.com, No. IPCOM000246048D, Apr. 29, 2016, pp.

"Elastic Rate Limiting in Virtual Environment", IP.com, No. IPCOM000269976D, May 27, 2022, 5 pp.

Madipelli, et al., "The Red Algorithm—Averaged Queue Weight Modeling for Non Linear Traffic", Blekinge Institute of Technology, Nov. 2009, 65 pp.

Matni,"Optimal Zero-Queue Congestion Control Using Admm", 2020, 7 pp.

"Intel Ethernet Network Adapter E810-2CQDA2-1", Intel, 0223/ED/123E, 639389-009US, 4 pp.

"Intel scalable-io-virtualization-technical-specification", Intel, Technical Specification, Sep. 2020, 29 pp.

"Single Root I/O Virtualization", IBM Corporation, Dec. 8, 2022, 2 pp., [onlne][retrieved Mar. 3, 2023] https://www.ibm.com/docs/en/power9?topic=networking-single-root-io-.

"PIC-SIG Single Root I/O Virtualization (SR-IOV) Support in Intel Virtualization Technology for Connectivity", Intel, White Paper, 2008, 4 pp.

"Red Hat Enterprise Linux 6 Virtualization Host Configuration and Guest Installation Guide", Red Hat, Aug. 19, 2020, 149 pp.

"Red Hat Enterprise Linux 9 Configuring and Managing Virtualization", Red Hat, Apr. 12, 2023, 284 pp.

AMD Secure Encrypted Virtualization (SEV), Retrieved from: https://developer.amd.com/sev/, 2021, 8 pages.

ARM TrustZone Technology, Retrieved from: https://developer.arm.com/ip-products/security-ip/trustzone, 2021, 12 pages.

Baumann, et al., Shielding Applications from an Untrusted Cloud with Haven, In Proceedings of the 11th USENIX Symposium on Operating Systems Design and Implementation, Oct. 6-8, 2014, pp. 267-283.

Firestone, et al., Azure Accelerated Networking: SmartNICs in the Public Cloud, In Proceedings of the 15th USENIX Symposium on Networked Systems Design and Implementation (NSDI'18), Apr. 9-11, 2018, pp. 51-64.

Forencich, et al., Corundum: An Open-Source 100-Gbps NIC, In Proceedings of the 28th IEEE International Symposium on Field-Programmable Custom Computing Machines, 2020, 9 pages.

Huang, et al., FlashBlox: Achieving Both Performance Isolation and Uniform Lifetime for Virtualized SSDs, In Proceedings of the 15th USENIX Conference on File and Storage Technologies (FAST'17), Feb. 27-Mar. 2, 2017, pp. 375-390.

Intel, Intel Trust Domain Extensions, Retrieved from: https://www.intel.com/content/www/us/en/products/docs/accelerator-engines/trust-domain-extensions.html, 2021, 5 pages.

Xilinx, Xilinx Launches Industry's First SmartNIC Platform Bringing Turnkey Network, Storage and Compute Acceleration to Cloud Data Centers, Retrieved from: https://www.prnewswire.com/news-releases/xilinx-launches-industrys-first-smartnic-platform-bringing-turnkey-network-storage-and-compute-acceleration-to-cloud-data-centers-301014893.html, Mar. 3, 2020, 5 pages.

* cited by examiner

700

DYNAMIC ASSIGNMENT OF DEVICE QUEUES TO VIRTUAL FUNCTIONS TO PROVIDE TO VIRTUAL MACHINES

BACKGROUND OF THE INVENTION

1. Field of the Invention

The present invention relates to a computer product, system, and method for dynamic assignment of device queues to virtual functions to provide to virtual machines.

2. Description of the Related Art

Devices providing network, storage and acceleration functions (e.g. GPU) are building the backbone of modern cloud and enterprise systems. They provide multi-tenancy through multiple virtual functions giving each tenant (e.g. virtual machine or VM) a virtual device. A virtual function comprises a mapping of network adaptor physical resources to virtual representations of those resources that may be provided to the virtual machines. The virtual functions are passed through to the virtual machines (VM), thus removing the virtual machine hypervisor or virtual machine manager in the host from the data path and, to some extent, from the control path.

Network adaptors typically support a fixed number of transmission TX/receiving (RX) queues and these queues are assigned/distributed among the number of supported virtual functions in a static manner. The higher the number of assigned virtual functions, the smaller the number of queues per virtual function. The number of queues for a network adaptor to queue virtual machine requests is directly related to the achievable bandwidth of a virtual function. Cloud providers often require users to utilize multiple virtual network adaptors in virtual machines to achieve higher bandwidth.

There is a need in the art for improved techniques for assigning device resources to virtual functions in a device shared among multiple virtual machines, such as a network adaptor.

SUMMARY

Provided are a computer product, system, and method for dynamic assignment of device queues to virtual functions to provide to virtual machines. Queues are assigned to a virtual function to access the physical functions of the device. The virtual function is provided to a virtual machine to use to access the physical functions of the device. A determination is made of a utilization of the queues assigned to the virtual function accessed by the virtual machine. A number of the queues assigned to the virtual functions for requests submitted by the virtual machine is changed in response to the determined utilization.

DETAILED DESCRIPTION

Figure 1:
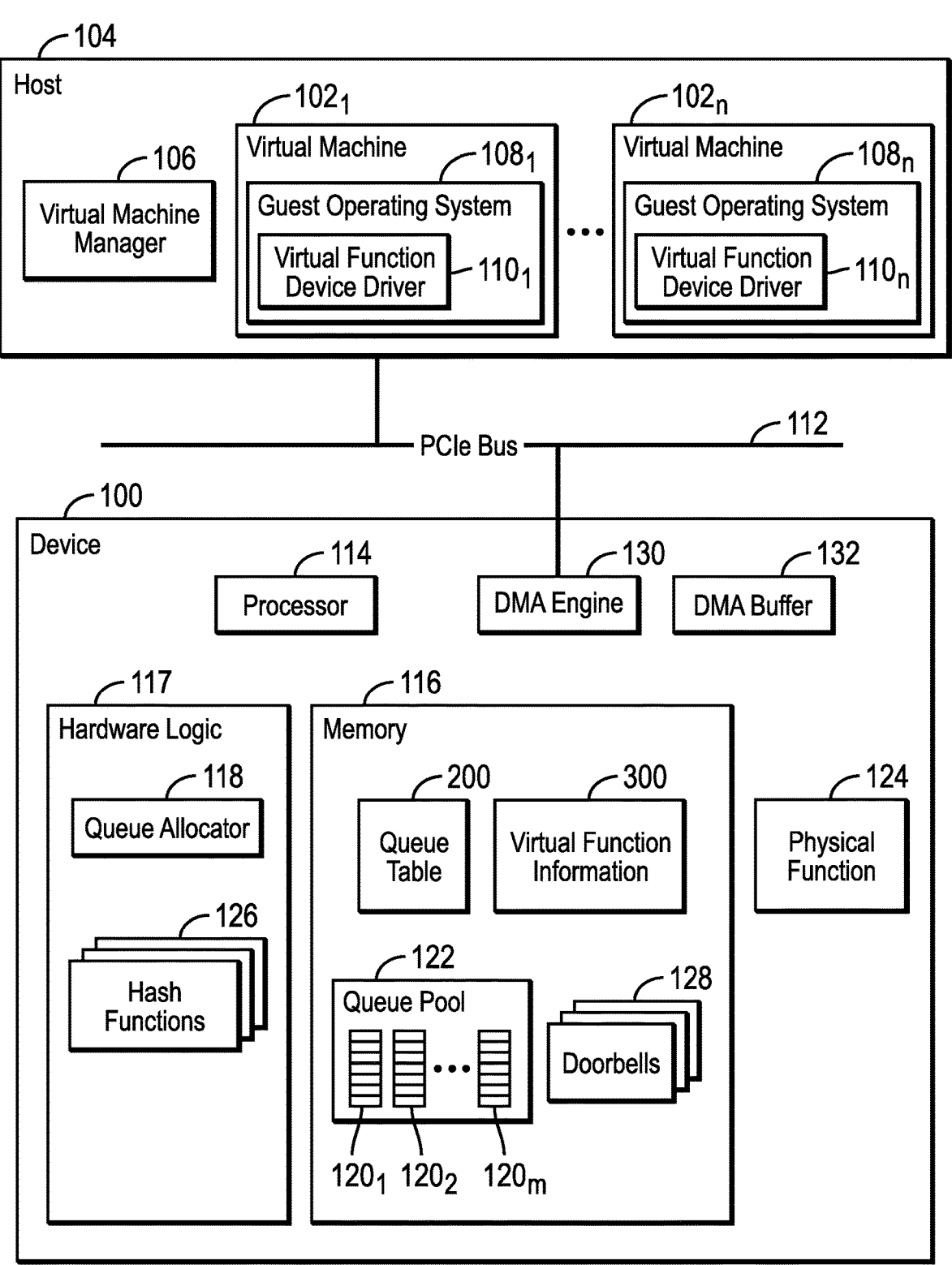
FIG. 1 illustrates an embodiment of a computing environment of virtual machines accessing a device.

In hosts having multiple virtual machines, certain of the virtual machines may have higher demand for the hardware device, such as a network adaptor, than others. Moreover, some of the virtual functions, and hence the queues associated with them, may remain unallocated to any virtual machines. This leads to congestion on certain virtual machines, while unused queues are allocated to the virtual machines with lower demands. Furthermore, demand across virtual machines might fluctuate over time. Yet further, hardware devices, such as network adaptors, often use hash functions to distribute jobs to different queues for load balancing. Based on workload characteristics, this can lead to congestion on some queues while other queues are underutilized. Further, for large scale systems, hash collisions become more prevalent, leading to many sessions being routed to the same queue and resulting in congestion.

Described embodiments provide improvements to computer technology to address the above issues by providing a dynamic allocation and distribution scheme that allows for assigning queues based on dynamic requirements. Described embodiments provide for more flexible utilization of available shared hardware resources and to switch the work distribution scheme for queues based on queue states. Described embodiments provide two components, dynamic allocation of the number of queues to the different virtual functions to match demand and switching between queue assignment schemes, e.g., hashing schemes, to balance load across the queues.

To dynamically assign queues or other resources in a device to virtual functions that are provided to virtual machines, the device maintains a pool of free queues, prefetch buffers and doorbells. These pooled resources may not be statically allocated to any specific virtual function. As the virtual machines request a virtual function, certain number of queues from the pool are allocated to the virtual function, based on the specific request from the virtual machine. On the virtual machine, the device driver preallocates the queues but does not activate any queue. The queues are activated once the device dynamically allocates them to the virtual machine.

The described embodiments may further utilize a table with a mapping of the queues to the virtual functions. A monitor function on the hardware device monitors the states of the various queues and allocates/deallocates the queues to the virtual functions based on demand. The monitor function also monitors the utilization of the queues relative to other queues and switches to a different function, e.g., a different hash function, for packet steering in case of load imbalance amongst the queues.

For the dynamic queue distribution component, described embodiments distribute queues dynamically and on a workload-tailored on-demand basis among the virtual functions. Virtual functions associated with virtual machines with high demand may have a higher number of queues dynamically assigned than assigned to lower demand virtual machines. The initial assignment of queues to a virtual machine may involve the virtual machine explicitly requesting a certain number of queues or the device automatically allocating some number of queues and allocating/deallocating additional queues to a virtual function based on the state of the queues/workload demand. To avoid frequent allocation/deallocation, high/low watermarks and hysteresis on queue occupancy may be utilized to determine when additional queues are to be allocated and when queues are deallocated from a virtual function.

For the queue load balancing component, the hashing scheme for a virtual function may be changed to a different hashing scheme to direct requests to different queues based on the congestion in the queues. The hardware devices may maintain multiple hash functions for the distribution of network traffic across queues. The device monitors the state of different queues and redistributes the packets to the queues by switching to a different hashing scheme.

FIG. 1 illustrates an embodiment of a computing environment to allow virtualization of physical functions in a device $100$ as virtual functions to provide to virtual machines $102_1$ . . . $102_n$ running in a host system $104$. The host system $104$ includes a virtual machine manager $106$ that creates and supports the allocation of host $104$ resources to the virtual machines $102_1$ . . . $102_n$ running in the host $104$. Each virtual machine $102_1$ . . . $102_n$ includes a guest operating system $108_1$ . . . $108_n$ and a virtual function device driver $110_1$ . . . $110_n$ to utilize assigned virtual functions to interact with the device $100$.

The host $104$ and the device $100$ connect over a Peripheral Component Interconnect Express (PCIe) bus $112$. The device $100$ includes a processor $114$, a memory $116$, and hardware logic $117$. The hardware logic $117$ includes a queue allocator $118$ to allocate and monitor queues associated with virtual functions. The memory $116$ includes a queue table $200$ having entries mapping queues $120_1$ . . . $120_m$ in a queue pool $122$ to virtual functions, where the queues store requests from the virtual machines $102_1$ . . . $102_n$ directed toward physical functions $124$ in the device $100$. The physical functions $124$ comprise the resources of the device $100$ shared through the virtual functions provided to the virtual machines $102_1$ . . . $102_n$. For instance, for a device $100$ comprising a network interface card (NIC), the physical functions $124$ comprise network ports and the queues $120_1$ . . . $120_m$ queue requests directed to the ports.

A virtual function represents a virtualized instance of the network adaptor resources. Each virtual function may have its own PCIe configuration space. Virtual functions may share one or more physical resources on the device $100$ with the virtual machines $102_1$ . . . $102_n$. The virtual function provides a mechanism to transfer data between a virtual function device driver $110_1$ . . . $110_n$ and the underlying resource on the device $100$. The virtual function device driver $110_1$ . . . $110_n$ manages the virtual function assigned to the corresponding host system $102_1$ . . . $102_n$.

In certain implementations, the virtual function may comprise a Single Root I/O Virtualization (SR-IOV) function for hardware devices supporting SR-IOV, including network adaptors and virtualized Graphic processing units (GPUs). With SR-IOV, virtual functions are attached to virtual machines to provide virtual machines direct access to a PCI device, such as a network adaptor. Described embodiments are not limited to SR-IOV implementations and may be applied to instances where access of a device is shared by multiple entities (e.g., by multiple virtual machines).

The memory $116$ of the device $100$ further includes virtual function information $300$ providing information representing virtual functions allocated to the virtual machines $102_1$ . . . $102_n$. Requests from the virtual machines $102_1$ . . . $102_n$ are processed by one of multiple hash functions $126$ in the hardware logic $117$ to perform load balancing of requests to the queues $120_1$ . . . $120_m$ when allocating requests from a virtual machine $102_i$ to one of multiple queues $120_1$ allocated to a virtual function assigned to the virtual machine $102_i$, where J comprises a set of queues assigned to virtual function $302$. Examples of load balancing hash functions that process information from a request to hash to a queue number include: Secure Hash Algorithm (SHA), Bitwise XOR (which takes address bits and XORs to produce a hash value representing a queue number $120j$), modulo hashing, etc. Further, one of the doorbells $128$ may be assigned to a virtual function for the virtual machine $102_i$ assigned to that virtual function to notify the device after writing to a queue $120_j$ assigned to the virtual function.

The device $100$ may include a Direct Memory Access (DMA) engine $130$ and DMA buffer $132$ to move data and requests from the virtual machines $102_1$ . . . $102_n$ via the PCIe bus $112$ to the queues $120_1$ . . . $120_m$ and then to the physical functions $124$ that consume the requests.

The program components of FIG. 1, including components $102_1$ . . . $102_n$, $106$, $108_1$ . . . $108_n$, $110_1$ . . . $110_n$, $118$, $126$, may comprise program code loaded into computer memory and executed by one or more processors. Alternatively, some or all of the functions may comprise hardware logic implemented as microcode, logic gates, or firmware in hardware devices, such as in Application Specific Integrated Circuits (ASICs).

The memory $116$ may comprise suitable volatile or non-volatile memory devices known in the art, such as a Static Random Access Memory (SRAM), Dynamic Random Access Memory (DRAM), solid state storage device (SSD) comprised of solid state electronics, NAND storage cells, etc.

The host $104$ and device $100$ may communicate over interfaces and networks other than a PCIe bus $112$.

Figure 2:
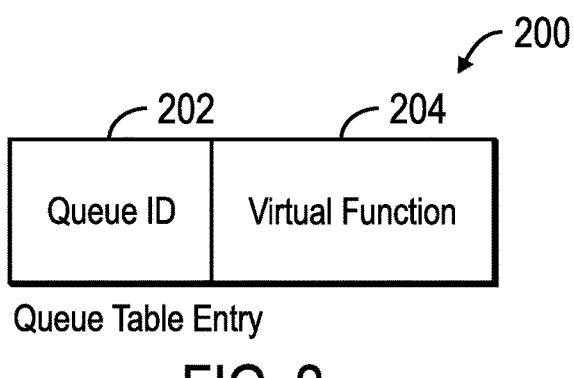
FIG. 2 illustrates an embodiment of a queue table entry to map virtual functions to queues.

FIG. 2 illustrates an embodiment of an instance $200_1$ of an entry in the queue table $200$ and includes: a queue identifier (ID) $202$ of one of the queues $120_1$ . . . $120_m$, such as an integer number for queues 1 . . . m; and a queue assignment indicating a virtual function assigned to the identified queue $202$. If there is no virtual function assigned to a queue $202$, then the virtual function field $204$ may indicate unassigned.

The queue table $200$ allows dynamic assignment of queues to virtual functions, during the initial assignment and for reassignment during operations of the virtual machines $102_1$ . . . $102_n$, to accommodate increased or decreased workloads at the virtual machines $102_1$ . . . $102_n$.

Figure 3:
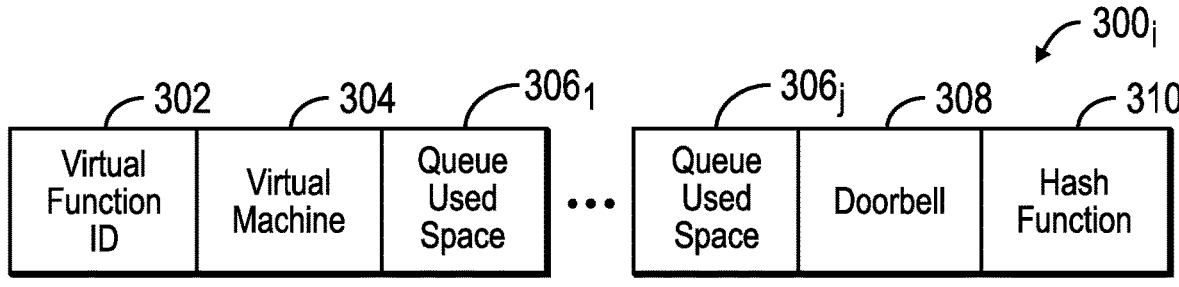
FIG. 3 illustrates an embodiment of virtual function information.

FIG. 3 illustrates an embodiment of an instance of virtual function information $3001$, in the virtual function information $300$, representing one virtual function i and includes: a virtual function identifier (ID) $302$; a virtual machine $304$ to which the virtual function $302$ is assigned; queue used space $306_1$ . . . $306_j$ for queues $120_j$ assigned to the virtual function $302$ (alternatively field $306_j$ may indicate queue available space); a doorbell $308$ assigned to the virtual function $302$; and a hash function $310$, of the hash functions $126$, used to load balance requests received from the virtual machine $304$ to the queues $120_j$ assigned to the virtual function $302$.

The used space $306_i$ for a queue may indicate used entries in the queue or used amount of space, such as in kilobytes, megabytes, etc. Alternatively, the space measurement may indicate available or unused space.

Figure 4:
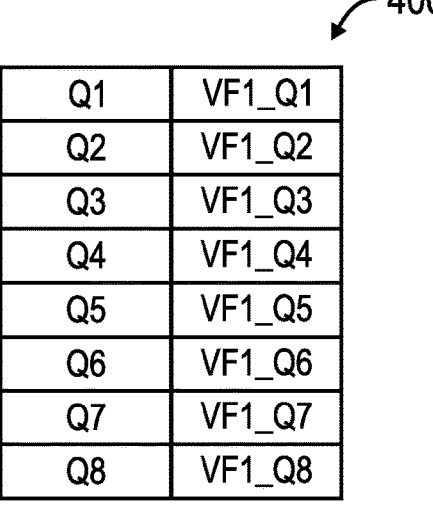
FIG. 4 illustrates an example of a queue table.

FIG. 4 illustrates an example $400$ of the queue table $200$ as having entries for eight queues Q1 . . . Q8, where each entry provides a virtual function i ($VF_i$) and queue j ($Q_j$) of $VF_i$ assigned to the queue Qi. In this way, the queues of the virtual function are allocated to the queues $120_1$ . . . $120_8$ in the queue pool $122$.

Figure 5:
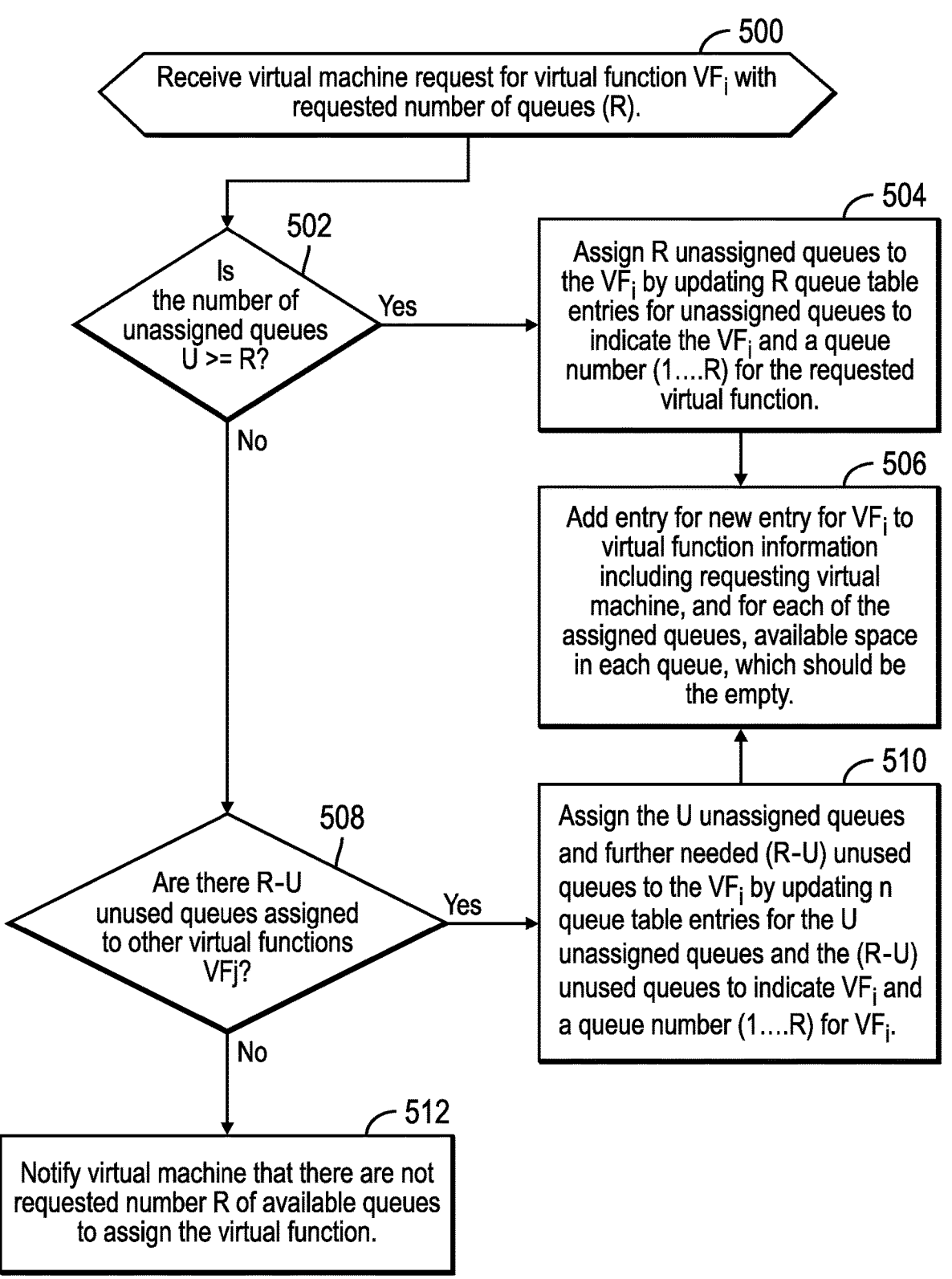
FIG. 5 illustrates an embodiment of operations to assign queues to a virtual function requested by a virtual machine.

FIG. 5 illustrates an embodiment of operations performed by the queue allocator 118 to assign requests to a virtual function requested by one of the virtual machines $102_i$, where the request indicates a number of queues to assign to the virtual function based on the expected workload from the virtual machine $102_i$. The virtual function device driver $110_i$ in the virtual machine $102_i$ may initiate the request with the requested number of queues. Upon receiving (at block 500) the request for a virtual function ($VF_i$) for a requested number of queues (R) from virtual machine $102_i$, the queue allocator 118 determines (at block 502) whether the number of unassigned queues indicated in the queue table 200 is at least equal to the number of requested (R) queues. If so, then the allocator 118 assigns (at block 504) the requested number (R) of unassigned queues to the virtual function ($VF_i$) to create the virtual function by updating R queue table entries $200_i$ with unassigned queues to indicate the requested virtual function $VF_i$ and a queue number (1 . . . R) for the queue assigned to the virtual function $VF_i$. An entry $300_i$ is added (at block 506) to the virtual function information 300 for the new virtual function $VF_i$ and indicates the new virtual function ID in field 302; the requesting virtual machine $102_i$ in field 304, and for each of the assigned R queues, indicate used space $306_i$ in each allocated queue, which should be none because, coming from block 504, the assigned queues are unassigned and should be empty.

If (at block 502) the number of unassigned queues (U) is less than the requested number of queues (R), then the queue allocator 118 determines (at block 508) whether there are R-U (the number of additional queues needed to supplement the unassigned queues to satisfy the requested number of queues (R)) unused queues assigned to other virtual functions $102_j$ ($VF_j$), which are unused and can be allocated to a different virtual function. If (at block 508) there are R–U unused queues, then the queue allocator 118 assigns (at block 510) the U available unassigned queues and further needed (R–U) unused queues to the new virtual function $102_i$ ($VF_i$) by updating queue table 200 entries for the U unassigned queues and the (R–U) unused queues to indicate the new virtual function ($VF_i$) and a queue number (1 . . . R) for the new virtual function ($VF_i$) in field 204 for the unused queues. Unused queues comprise queues currently assigned to a virtual function but remain unused. From block 510, control proceeds to block 506 to add virtual function information $3001$ for the new virtual function ($VF_i$) and its assigned R queues.

If (at block 508) there are not R–U unused queues that are available to reassign from other virtual functions ($VF_j$) to the new virtual function ($VF_i$), then the requesting virtual machine $102_i$ is notified (at block 512) that the requested number (R) of queues cannot be allocated to the new virtual function, or notified of failure of the request for a virtual function with a specified number of queues.

With the embodiment of FIG. 5, the queue allocator 118 may allocate a number of requested queues to a virtual function requested by a virtual machine $102_i$ that varies depending on the anticipated workload from a virtual machine $102_i$. This optimizes queue assignments by avoiding unneeded queues to a virtual function so that such unneeded queues can be assigned to virtual functions for virtual machines having a larger workload requiring more queues $120_i$ for the device 100. This allows virtual machines to request the appropriate number of queues that are needed for a virtual function to optimize the assignment of queues to virtual functions.

Figure 6:
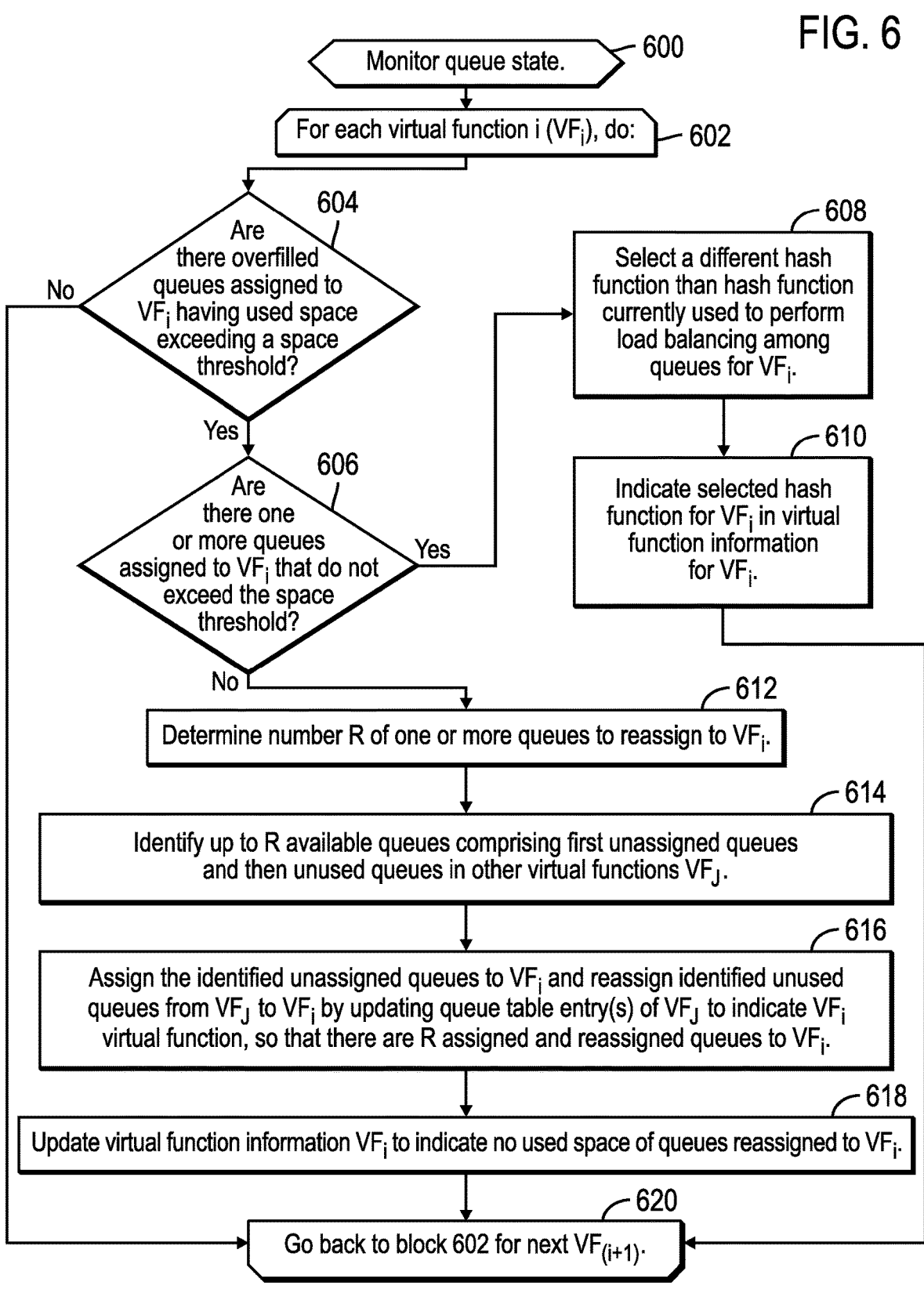
FIG. 6 illustrates an embodiment of operations to monitor the queue state of queues in the device assigned to virtual functions provided to virtual machines.

FIG. 6 illustrates an embodiment of operations performed by the queue allocator 118 to monitor the state of the queues $120_1$ . . . $120_m$ to determine whether to reallocate underutilized queues $120_1$ . . . $120_m$ from virtual functions to virtual functions whose assigned queues are overutilized, or to deallocate such underutilized queues from virtual functions and add the freed-up queues back to the pool 122 of available queues. This operation may be periodically performed for all virtual functions, as shown in FIG. 6, or performed for one virtual function when receiving a request to the virtual function from the virtual machines $102_1$ . . . $102_n$. Upon initiating (at block 600) monitoring of the queue state, a loop of operations is performed at blocks 602 through 620 for each virtual function ($VF_i$) indicated in the virtual function information 300. If (at block 604) there is an overfilled queue $120_o$ assigned to virtual function ($VF_i$) having used space $3060$ exceeding a space threshold and if (at block 606) there are one or more queues assigned to virtual function ($VF_i$) whose used space $306_i$ does not exceed a second threshold, i.e., not all queues are overfilled beyond the second space threshold, then the queue allocator 118 selects (at block 608) a different hash function 126 to use for load balancing than the hash function 310 currently used to perform load balancing among queues for virtual function ($VF_i$). The selected hash function 126 is indicated (at block 610) in field 310 of the virtual function information $3001$ for the virtual function ($VF_i$). In certain embodiments, the hashing scheme may be selected by randomly selecting another hashing function. Alternatively, the device 100 may maintain a history (using counters) on the performance of different hash functions and select hash functions whose counters indicate higher performance.

If (at block 606) all the queues $120_1$ for virtual function ($VF_i$), where "I" is the set of all queues assigned to virtual function ($VF_i$), are overfilled, i.e., all exceed the space threshold, then the queue allocator 118 determines (at block 612) a number R of one or more unused queues to reassign to virtual function ($VF_i$). This determination may be based on the number of queues needed to support the demand from the given virtual machine so that all queues assigned to the virtual function ($VF_i$) do not exceed the space threshold of used space. In certain embodiments, when additional queues are assigned to a virtual function or if a different hash function is used, existing entries in the queues are not being moved to different queues. Only the subsequent requests make use of the new hash function or additional queues. The queue allocator 118 identifies (at block 614) up to R available queues $120_R$ comprising first unassigned queues and then queues assigned to other virtual functions $VF_J$ that are unused (where J is the set of other virtual functions having unused queued). In certain embodiments, partially-occupied queues are not reassigned to another virtual function. In alternative embodiments, partially-occupied queues may be reassigned.

The identified unassigned queues are assigned (at block 616) to virtual function ($VF_i$) and, if needed, the identified unused queues are reassigned from the determined one or more virtual functions ($VF_j$) to virtual function ($VF_i$) by updating queue table entries 300 for the reassigned queues to indicate virtual function ($VF_i$) as the virtual function 204. In this way, up to R queues are assigned and/or reassigned to virtual function ($VF_i$). The virtual function information $300_i$ for $VF_i$ is updated (at block 618) to indicate no used space of the queues reassigned to virtual function ($VF_i$). Control then proceeds (at block 620) back to block 602 to process any further virtual functions.

With the embodiment of FIG. 6, unused queues may be identified in virtual functions ($VF_j$) to reassign to virtual function ($VF_i$) having overfilled queues, or to add back to the pool 122 of available queues, to be later assigned to other virtual functions as needed. This dynamic reassignment and rebalancing of unused queues from one virtual function to another allows for the optimization of queue assignments to virtual functions as workloads in the virtual machines $102_1$ . . . $102_n$ change. In this way, virtual machines $102_1$ . . . $102_n$ whose workload increases may be assigned more device resources from virtual machines experiencing a lighter workload.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation or garbage collection, but this does not render the storage device as transitory because the data is not transitory while it is stored.

Figure 7:
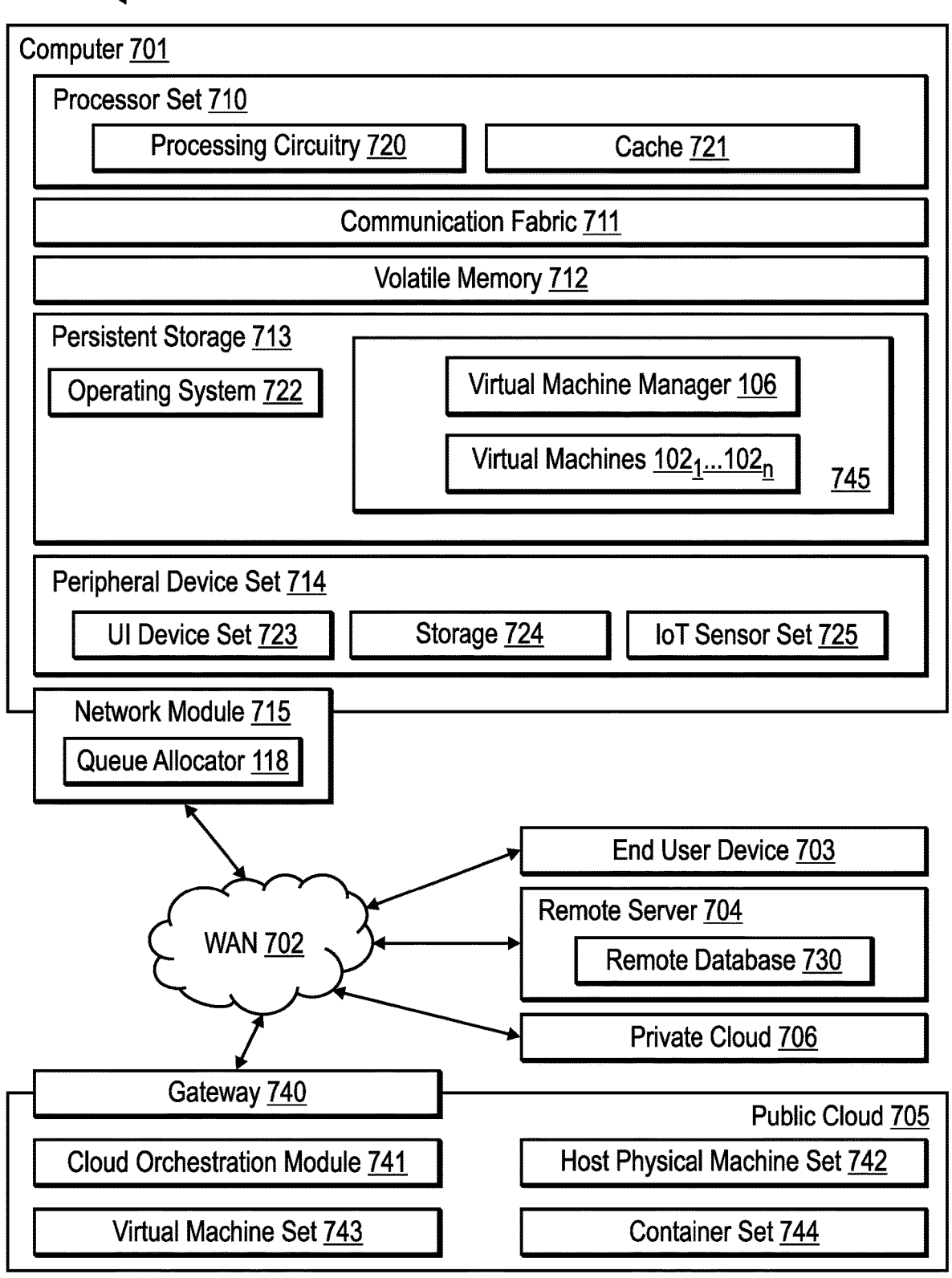
FIG. 7 illustrates a computing environment in which the components of FIG. 1 may be implemented.

FIG. 7, contains an example of an environment 700 for the execution of at least some of the computer code involved in performing the inventive methods to dynamically assign and reassign device resources, such as queues to virtual functions, and to dynamically select a hash function for load balancing requests among queues assigned to virtual functions, such as performed by the queue allocator 118 in the network module 715 to manage virtual functions assigned to virtual machines 1081 . . . 108*n*. allocation code 118 implemented in network module 715.

Computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and computer code 745, including virtual machine manager 106 and virtual machines $102_1$ . . . $102n$, peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, the performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions related to performing the inventive methods may be stored in block 745 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic random access memory (RAM) or static RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows the writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 745 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 115 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715. The network module 715 further includes the queue allocator 118 to allocate queues to virtual functions as described above.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after the instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments, a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The letter designators, such as, but not limited to, i, I, j, J, o, m, n, R, U, are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer product for assigning queues to virtual functions used to access physical functions of a device, the computer product comprising at least one of a computer readable storage medium having computer readable program code executed by a processor and a hardware device having hardware logic that when operable performs operations, the operations comprising:

assigning queues to a virtual function to access the physical functions of the device, wherein assigning the queues allocates physical resources on the device to the virtual function;

providing the virtual function to a virtual machine to use to access the physical functions of the device;

using a first queue assignment scheme of a plurality of queue assignment schemes to load balance requests from the virtual machine to the queues of the virtual function;

determining a utilization of the queues assigned to the virtual function accessed by the virtual machine;

assigning an additional queue to the virtual function in response to determining a first utilization of the queues assigned to the virtual function, wherein assigning the additional queue allocates additional physical resources on the device to the virtual function; and selecting a second queue assignment scheme of the plurality of queue assignment schemes to load balance requests from the virtual machine to the queues and the additional queue in response to determining a second utilization of the queues and the additional queue assigned to the virtual function.

2. The computer product of claim 1, wherein the operations further comprise:

receiving a request from the virtual machine for the virtual function and a requested number of queues; and determining whether the requested number of queues are unassigned to virtual functions, wherein the assigning the queues to the virtual function comprises assigning unassigned queues, up to the requested number of queues, to the virtual function.

3. The computer product of claim 2, wherein the virtual function comprises a first virtual function and the virtual machine comprises a first virtual machine, wherein the operations further comprise:

determining whether a second virtual function is assigned an unused queue in response to determining that the requested number of queues are not unassigned; and reassigning the unused queue to the first virtual function in response to determining that the second virtual function is assigned the unused queue.

4. The computer product of claim 3, wherein the operations further comprise:

maintaining a queue table indicating queues as one of assigned to one of a plurality of virtual functions and unassigned; and indicating an unassigned queue or an unused queue as assigned to the first virtual function by updating an entry in the queue table for the unassigned queue or the unused queue to indicate the first virtual function.

5. The computer product of claim 1, wherein the first queue assignment scheme comprises a first hash function, wherein the second queue assignment scheme comprises a second hash function, and wherein the queue assignment schemes comprise a plurality of hash functions used to load balance selection of the queues assigned to the virtual function to assign received requests, wherein the first and the second hash functions use different load balancing algorithms to assign requests to the queues.

6. The computer product of claim 5, wherein the second utilization comprises that the queues assigned to the virtual function include at least one queue having a number of requests exceeding a threshold number and at least one other queue assigned to the virtual function having a number of requests falling below the threshold number.

7. The computer product of claim 1, wherein the determining the first utilization comprises determining that all of the queues assigned to the virtual function have a number of requests exceeding a threshold number, and wherein the assigning the additional queue to the virtual function comprises:

determining whether there is an unassigned queue not assigned to any virtual function; and assigning the unassigned queue to the virtual function in response to determining there is the unassigned queue.

8. The computer product of claim 1, wherein the virtual function comprises a first virtual function, wherein the first utilization of the queues comprises all of the queues assigned to the first virtual function have a number of requests exceeding a threshold number, and wherein the assigning the additional queue to the first virtual function comprises reassigning an unused queue from a second virtual function to the first virtual function.

9. The computer program product of claim 1, wherein the first utilization of the queues indicates a first overfilled condition of the queues and the second utilization indicates a second overfilled condition of the queues, wherein the second overfilled condition indicates fewer overfilled queues than the first overfilled condition.

10. A system for assigning queues to virtual functions used to access physical functions of a device, comprising:

a hardware device having hardware logic that when operable performs operations, the operations comprising:

assigning queues to a virtual function to access the physical functions of the device, wherein assigning the queues allocates physical resources on the device to the virtual function;

providing the virtual function to a virtual machine to use to access the physical functions of the device;

using a first queue assignment scheme of a plurality of queue assignment schemes to load balance requests from the virtual machine to the queues of the virtual function;

determining a utilization of the queues assigned to the virtual function accessed by the virtual machine;

assigning an additional queue to the virtual function in response to determining a first utilization of the queues assigned to the virtual function, wherein assigning the additional queue allocates additional physical resources on the device to the virtual function; and selecting a second queue assignment scheme of the plurality of queue assignment schemes to load balance requests from the virtual machine to the queues and the additional queue in response to determining a second utilization of the queues and the additional queue assigned to the virtual function.

11. The system of claim 10, wherein the operations further comprise:

receiving a request from the virtual machine for the virtual function and a requested number of queues; and determining whether the requested number of queues are unassigned to virtual functions, wherein the assigning the queues to the virtual function comprises assigning unassigned queues, up to the requested number of queues, to the virtual function.

12. The system of claim 11, wherein the virtual function comprises a first virtual function and the virtual machine comprises a first virtual machine, wherein the operations further comprise:

determining whether a second virtual function is assigned an unused queue in response to determining that the requested number of queues are not unassigned; and reassigning the unused queue to the first virtual function in response to determining that the second virtual function is assigned the unused queue.

13. The system of claim 10, wherein the first queue assignment scheme comprises a first hash function, wherein the second queue assignment scheme comprises a second hash function, and wherein the queue assignment schemes comprise a plurality of hash functions used to load balance selection of the queues assigned to the virtual function to assign received requests, wherein the first and the second hash functions use different load balancing algorithms to assign requests to the queues.

14. The system of claim 10, wherein the determining the first utilization comprises determining that all of the queues assigned to the virtual function have a number of requests exceeding a threshold number, and wherein the assigning the additional queue to the virtual function comprises:

determining whether there is an unassigned queue not assigned to any virtual function; and assigning the unassigned queue to the virtual function in response to determining there is the unassigned queue.

15. The system of claim 10, wherein the virtual function comprises a first virtual function, wherein the first utilization of the queues comprises all of the queues assigned to the first virtual function have a number of requests exceeding a threshold number, and wherein the assigning the additional queue to the first virtual function comprises reassigning an unused queue from a second virtual function to the first virtual function.

16. The system of claim 10, wherein the first utilization of the queues indicates a first overfilled condition of the queues and the second utilization indicates a second overfilled condition of the queues, wherein the second overfilled condition indicates fewer overfilled queues than the first overfilled condition.

17. A method for assigning queues to virtual functions used to access physical functions of a device, comprising:

assigning queues to a virtual function to access the physical functions of the device, wherein assigning the queues allocates physical resources on the device to the virtual function;

providing the virtual function to a virtual machine to use to access the physical functions of the device;

using a first queue assignment scheme of a plurality of queue assignment schemes to load balance requests from the virtual machine to the queues of the virtual function;

determining a utilization of the queues assigned to the virtual function accessed by the virtual machine;

assigning an additional queue to the virtual function in response to determining a first utilization of the queues assigned to the virtual function, wherein assigning the additional queue allocates additional physical resources on the device to the virtual function; and selecting a second queue assignment scheme of the plurality of queue assignment schemes to load balance requests from the virtual machine to the queues and the additional queue in response to determining a second utilization of the queues and the additional queue assigned to the virtual function.

18. The method of claim 17, comprising:

receiving a request from the virtual machine for the virtual function and a requested number of queues; and determining whether the requested number of queues are unassigned to virtual functions, wherein the assigning the queues to the virtual function comprises assigning unassigned queues, up to the requested number of queues, to the virtual function.

19. The method of claim 18, wherein the virtual function comprises a first virtual function and the virtual machine comprises a first virtual machine, further comprising:

determining whether a second virtual function is assigned an unused queue in response to determining that the requested number of queues are not unassigned; and reassigning the unused queue to the first virtual function in response to determining that the second virtual function is assigned the unused queue.

20. The method of claim 17, wherein the first queue assignment scheme comprises a first hash function, wherein the second queue assignment scheme comprises a second hash function, and wherein the queue assignment schemes comprise a plurality of hash functions used to load balance selection of the queues assigned to the virtual function to assign received requests, wherein the first and the second hash functions use different load balancing algorithms to assign requests to the queues.

21. The method of claim 17, wherein the determining the first utilization comprises determining that all of the queues assigned to the virtual function have a number of requests exceeding a threshold number, and wherein the assigning the additional queue to the virtual function comprises:

determining whether there is an unassigned queue not assigned to any virtual function; and assigning the unassigned queue to the virtual function in response to determining there is the unassigned queue.

22. The method of claim 17, wherein the virtual function comprises a first virtual function, wherein the first utilization of the queues comprises all of the queues assigned to the first virtual function have a number of requests exceeding a threshold number and wherein the assigning the additional queue to the first virtual function comprises reassigning an unused queue from a second virtual function to the first virtual function.

23. The method of claim 17, wherein the first utilization of the queues indicates a first overfilled condition of the queues and the second utilization indicates a second overfilled condition of the queues, wherein the second overfilled condition indicates fewer overfilled queues than the first overfilled condition.

* * * * *